(12) United States Patent
Braedt

(10) Patent No.: US 9,181,994 B2
(45) Date of Patent: Nov. 10, 2015

(54) FREEWHEEL HUB FOR A BICYCLE

(71) Applicant: SRAM Deutschland GmbH, Schweinfurt (DE)

(72) Inventor: Henrik Braedt, Hambach (DE)

(73) Assignee: SRAM Deutschland GmbH, Schweinfurt (DE)

( * ) Notice: Subject to any disclaimer, the term of this patent is extended or adjusted under 35 U.S.C. 154(b) by 104 days.

(21) Appl. No.: 14/057,437

(22) Filed: Oct. 18, 2013

(65) Prior Publication Data

US 2014/0110208 A1   Apr. 24, 2014

(30) Foreign Application Priority Data

Oct. 18, 2012 (DE) .................. 10 2012 020 472

(51) Int. Cl.
*F16D 41/00* (2006.01)
*F16D 41/24* (2006.01)
*F16D 41/36* (2006.01)

(52) U.S. Cl.
CPC ............... *F16D 41/24* (2013.01); *F16D 41/36* (2013.01)

(58) Field of Classification Search
CPC ........... F16D 41/24; F16D 1/32; F16D 41/36; F16D 41/28
See application file for complete search history.

(56) References Cited

U.S. PATENT DOCUMENTS

| | | | |
|---|---|---|---|
| 4,593,799 A | 6/1986 | Ozaki | |
| 5,493,799 A | 2/1996 | Foo | |
| 5,676,227 A | 10/1997 | Hugi | |
| 5,964,332 A | 10/1999 | King | |
| 6,588,564 B1 | 7/2003 | Jager et al. | |
| 7,562,755 B2 | 7/2009 | Spahr | |
| 2003/0155204 A1 | 8/2003 | Demir et al. | |
| 2009/0255774 A1 | 10/2009 | Hsu | |
| 2012/0032498 A1 | 2/2012 | Klieber | |
| 2012/0048671 A1* | 3/2012 | Kozak et al. ..................... | 192/64 |
| 2013/0126292 A1* | 5/2013 | Lin ................................. | 192/64 |

FOREIGN PATENT DOCUMENTS

| | | |
|---|---|---|
| DE | 29803667 | 6/1998 |
| DE | 19731451 | 1/1999 |
| DE | 19847673 | 4/2000 |
| DE | 102007030190 | 1/2008 |
| DE | 202007016681 | 11/2008 |
| DE | 102010033272 | 2/2012 |
| DE | 102010033454 | 2/2012 |
| DE | 202011108822 | 4/2012 |
| EP | 2422996 | 2/2012 |
| EP | 2529949 | 12/2012 |

* cited by examiner

*Primary Examiner* — Robert Hodge
*Assistant Examiner* — Ryan Dood
(74) *Attorney, Agent, or Firm* — Milan Milosevich; Lisa Serdynski

(57) ABSTRACT

The invention relates to a freewheel hub for a bicycle including an axle and housing rotatably mounted thereon. A sprocket arrangement is mounted on the hub axle and a freewheel is arranged between the hub and the sprocket arrangement. The freewheel has a first coupling ring which couples to the hub and a second coupling ring which couples to the sprocket arrangement. The first and second coupling rings have respective tooth systems facing one another which are arrangeable into and out of mutual torque-transmitting engagement.

24 Claims, 16 Drawing Sheets

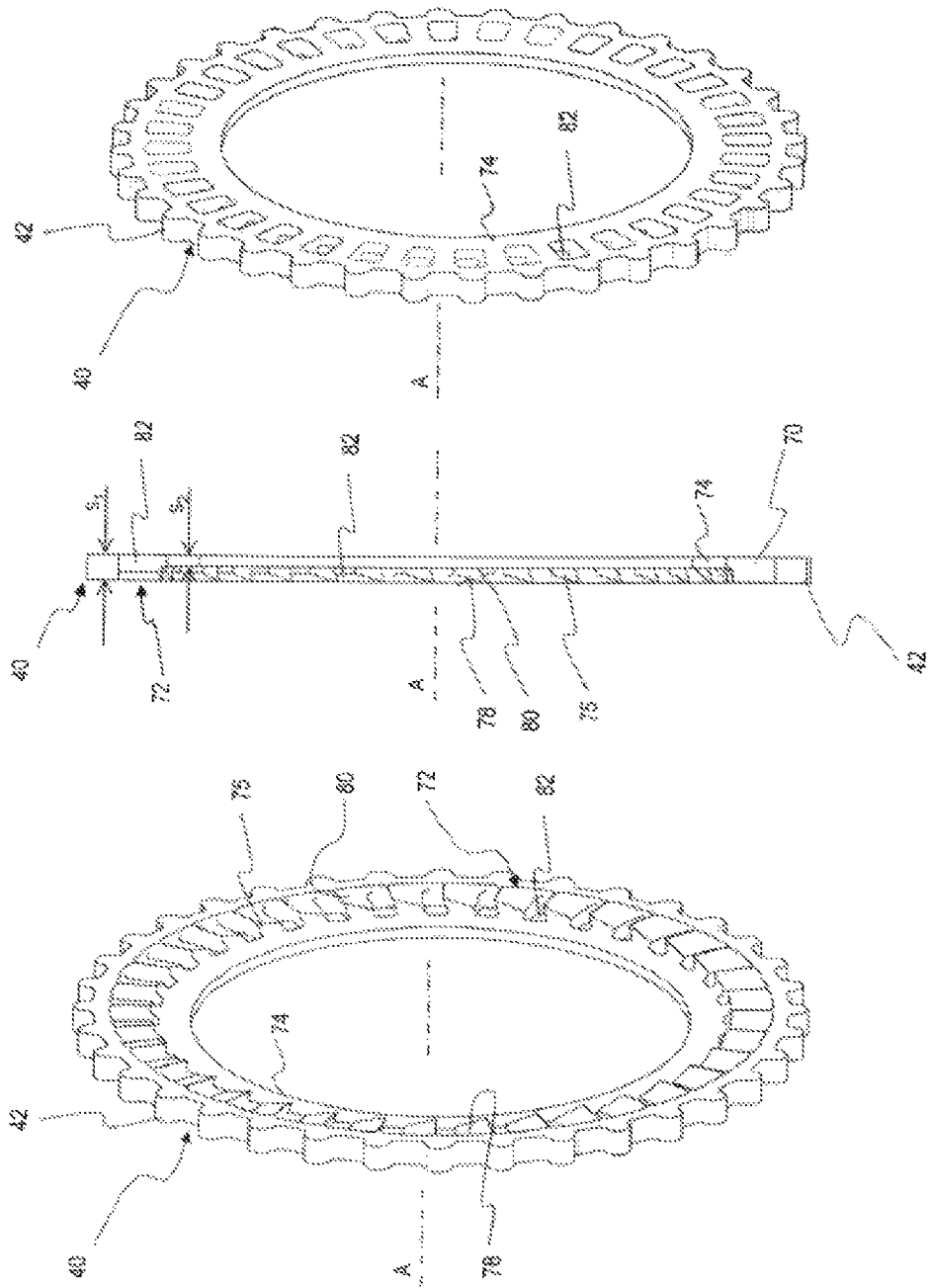

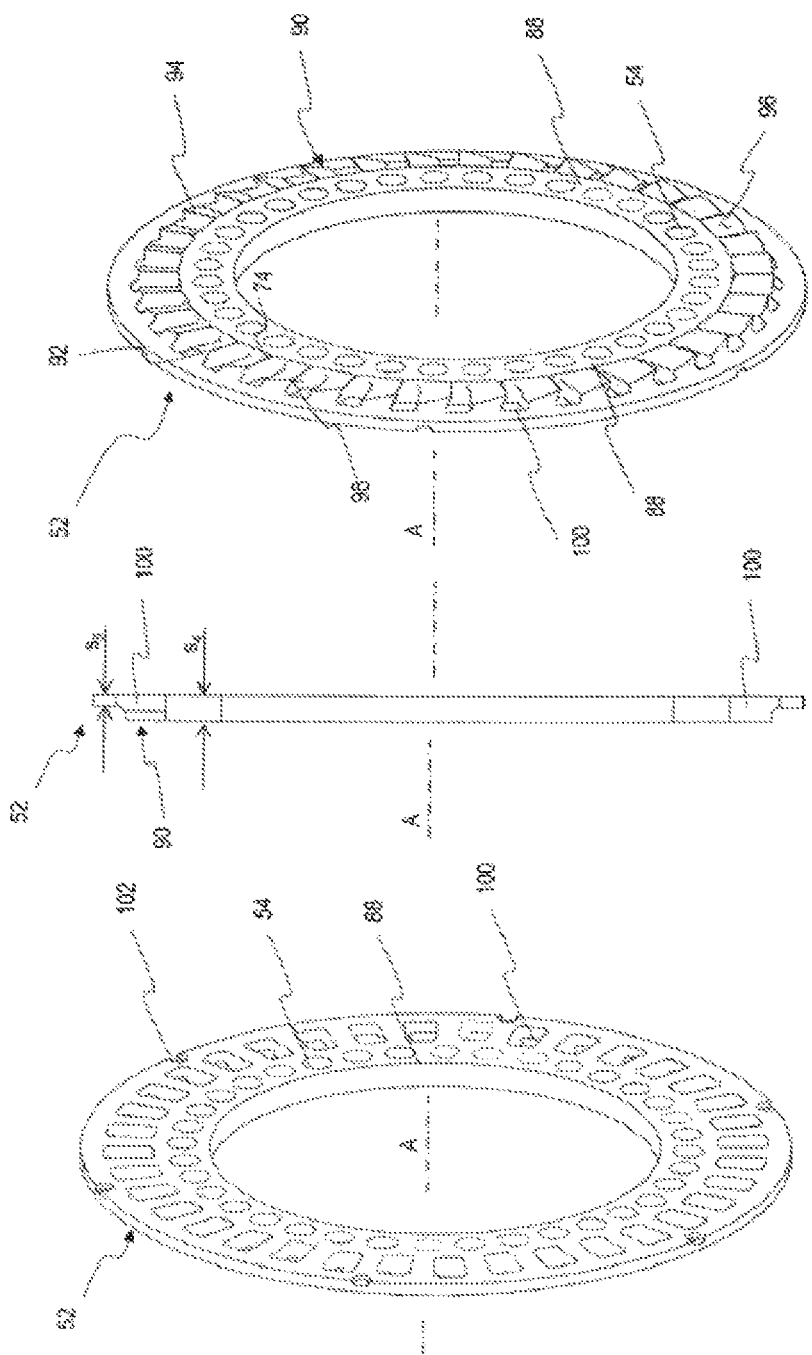

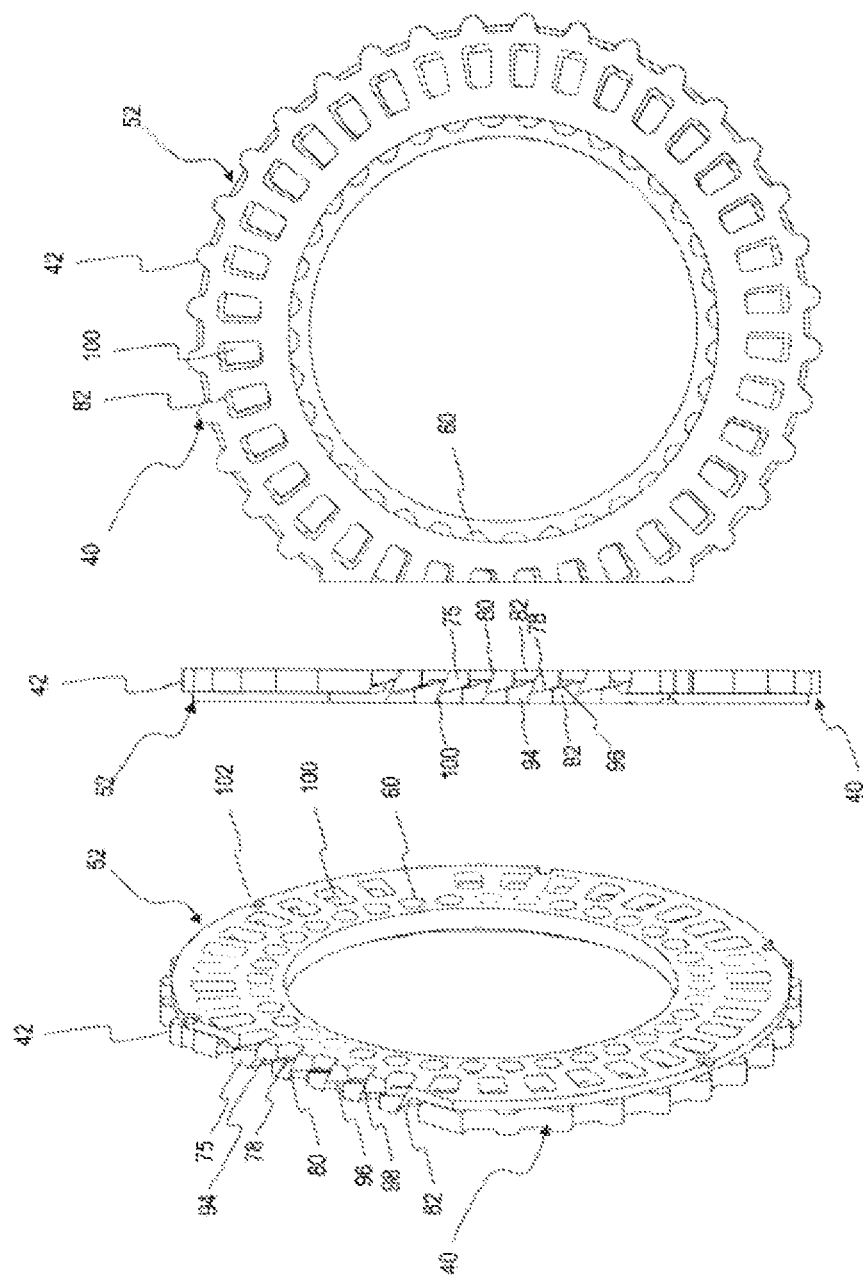

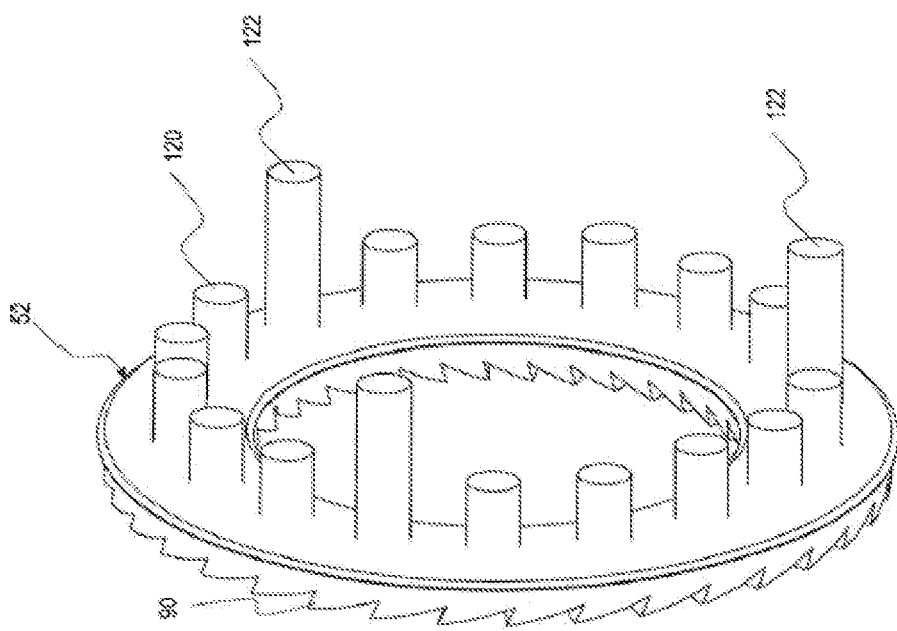

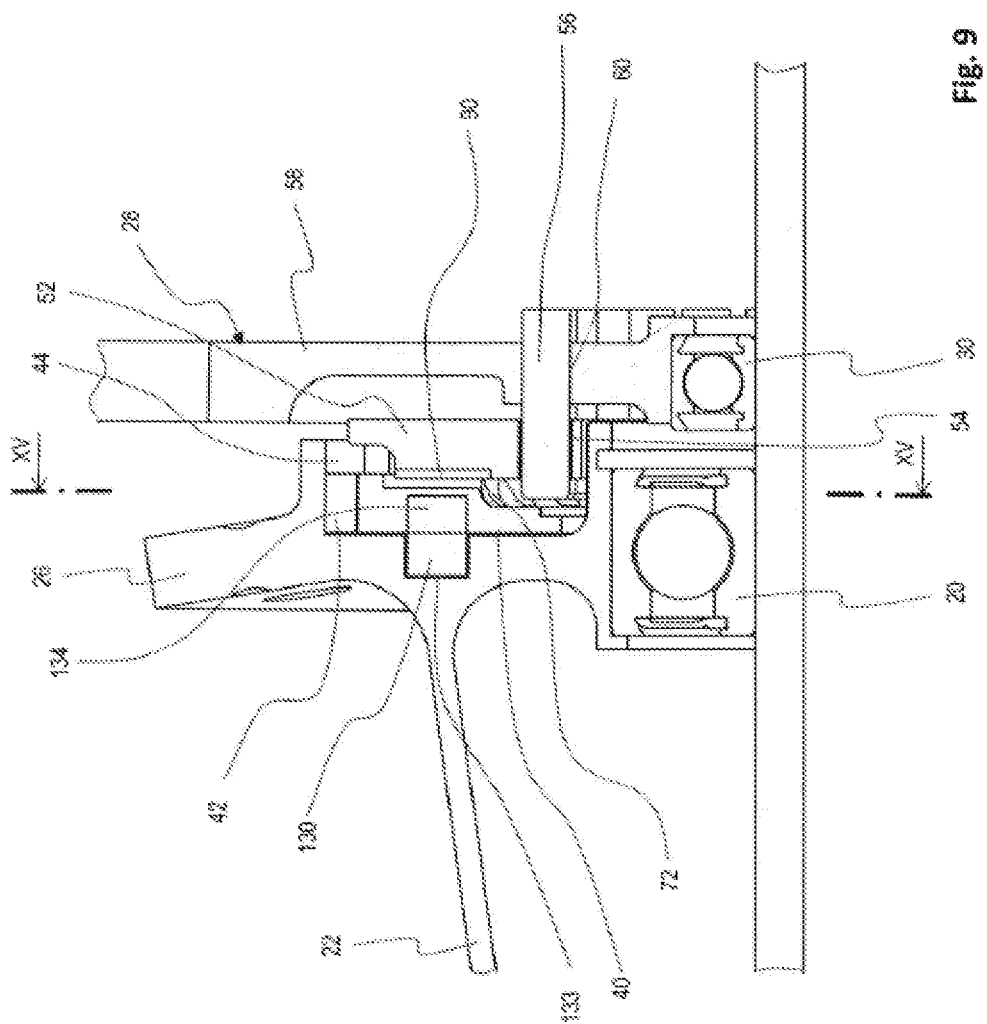

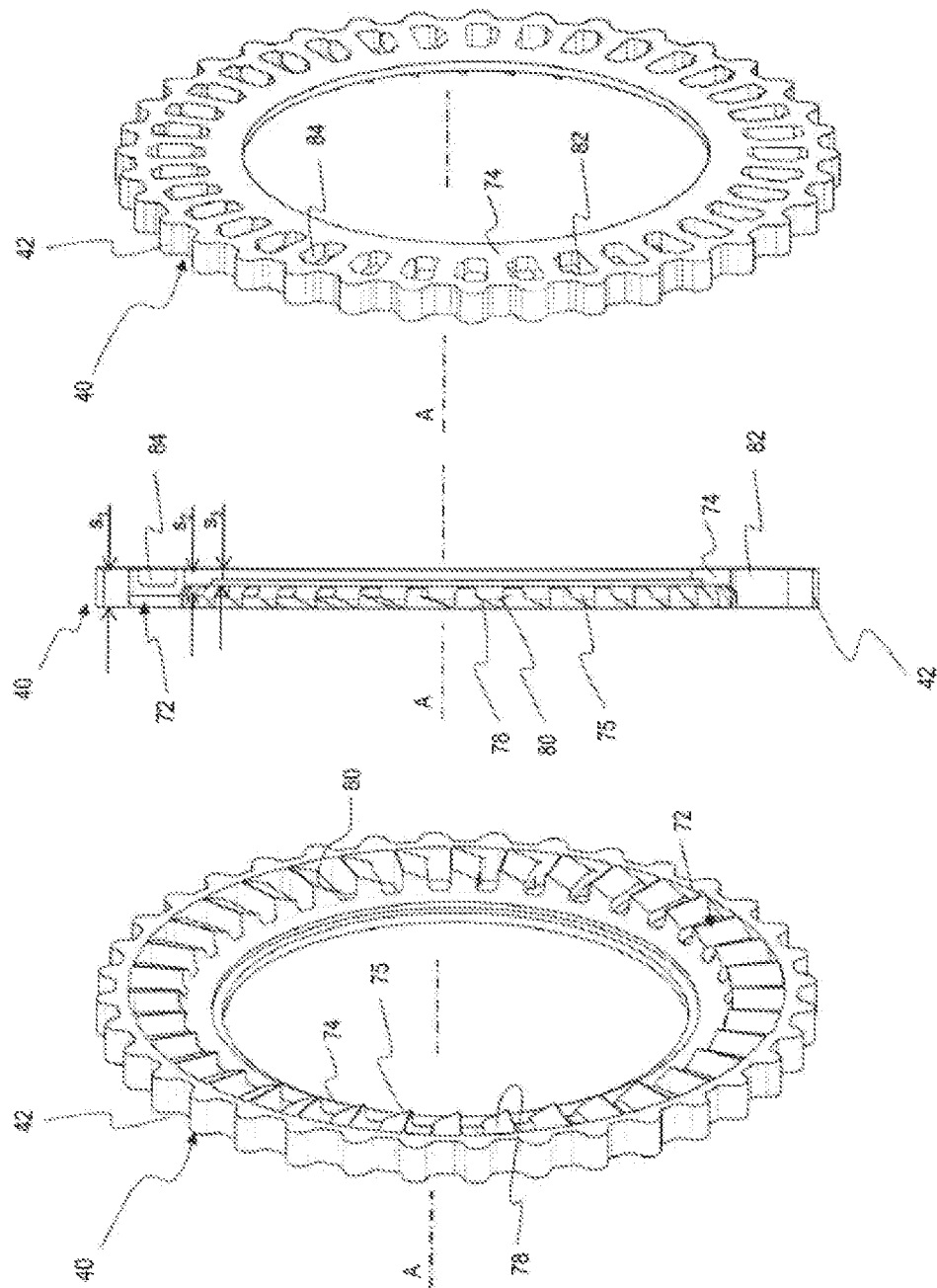

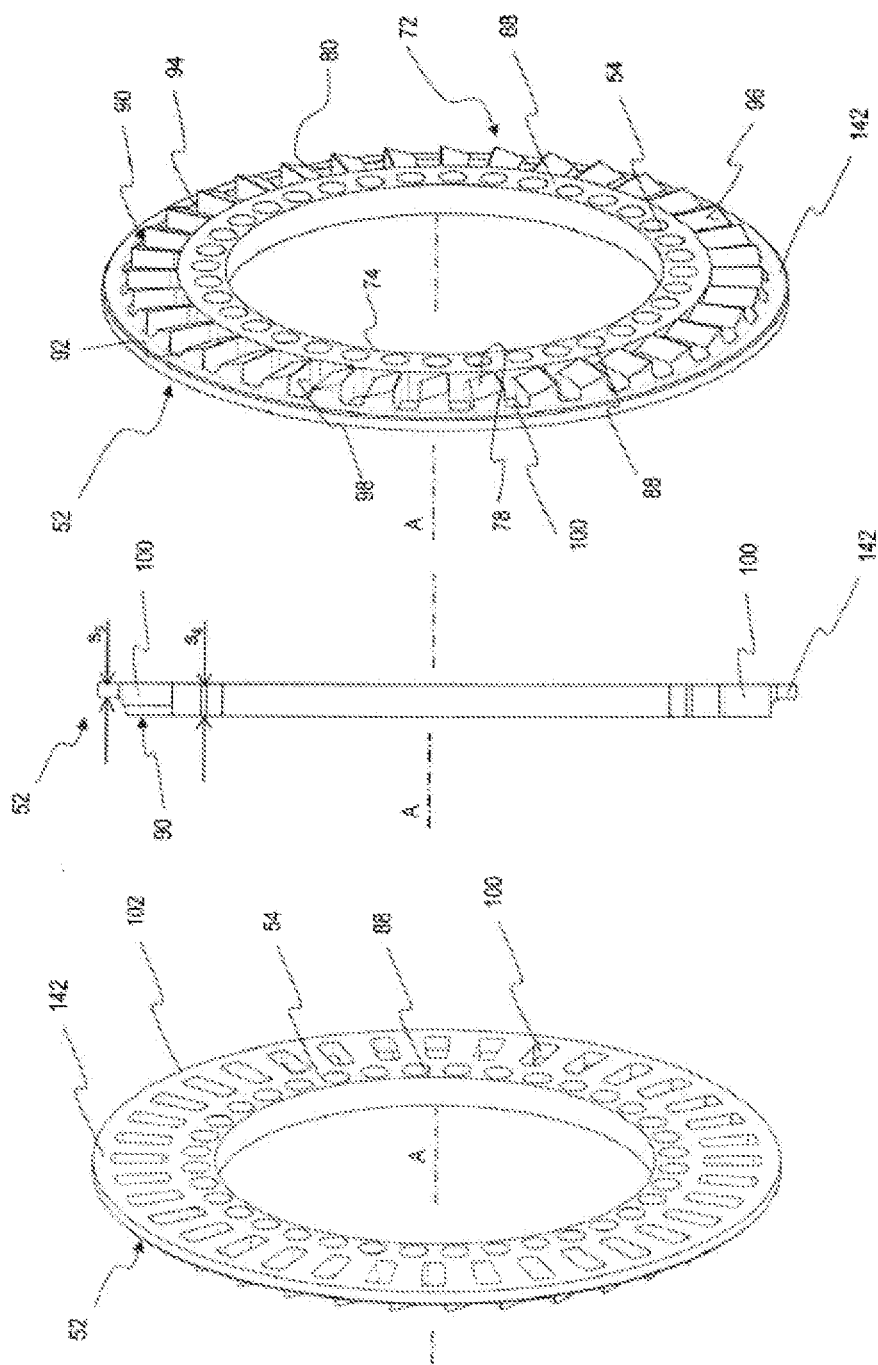

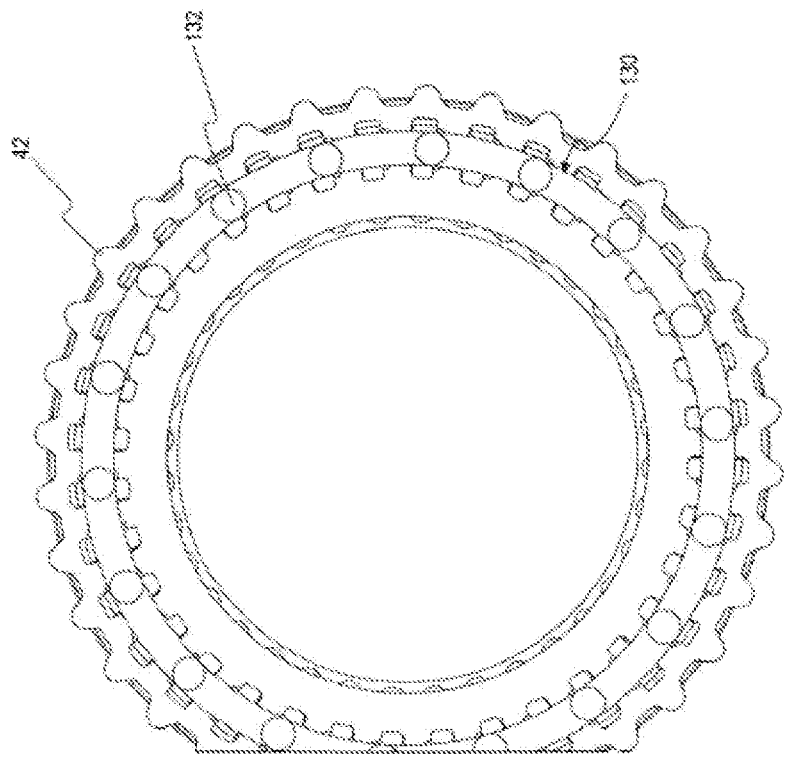
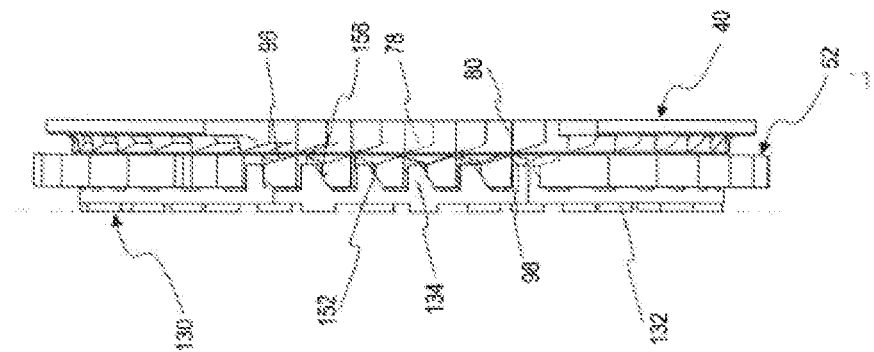

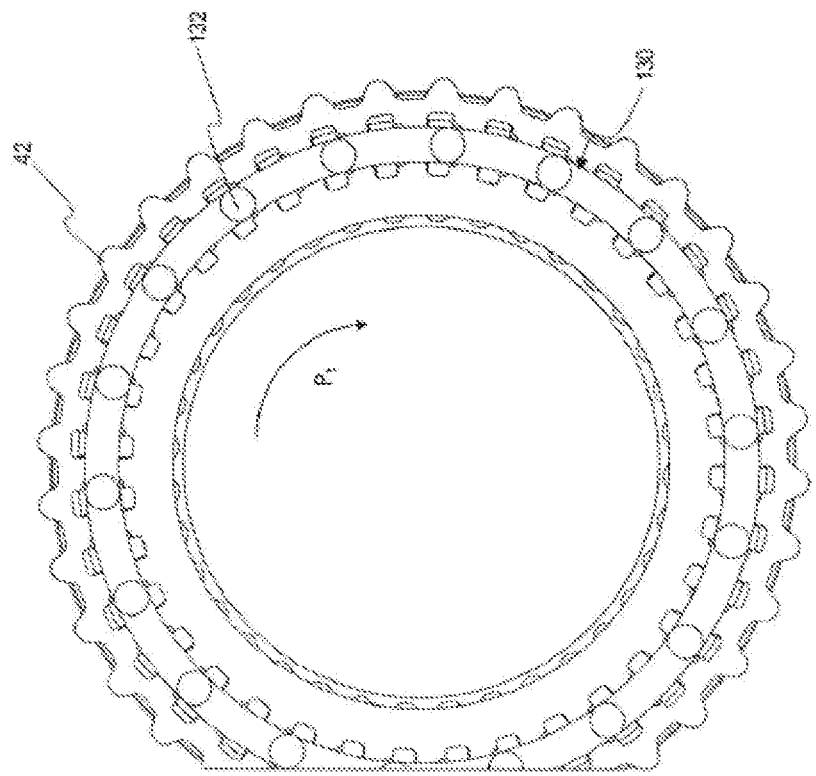
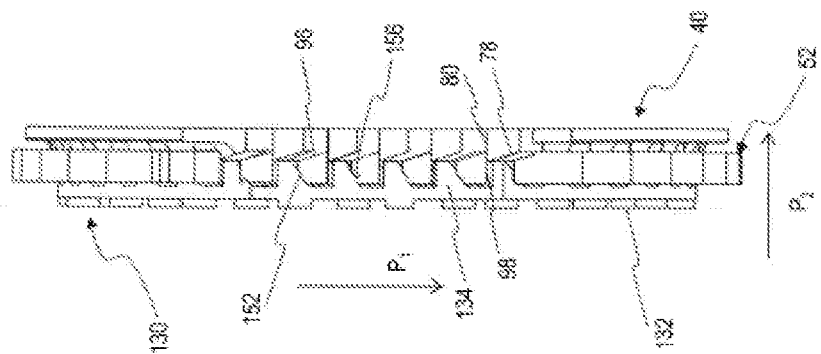

FREEWHEEL HUB FOR A BICYCLE

BACKGROUND OF THE INVENTION

The present invention relates to a freewheel hub for a bicycle.

Freewheel hubs have been disclosed in the prior art. For example, document DE 198 47 673 A1 shows a freewheel hub in which two coupling rings are each biased towards one another by means of a spring associated therewith. The disadvantage of this solution is that all components are arranged axially next to one another which leads to a relatively large axial length which is necessary for the freewheel arrangement. Also, the fact that both coupling rings are in each case formed with an external or peripheral tooth system for the transmission of torque with the sprocket arrangement or with the hub housing respectively makes for a significant installation space requirement, as these teeth must be sized to be sufficiently sturdy and long to guarantee reliable operation. Further, freewheel hubs of this design, in which at least one of the coupling rings is biased towards the other by means of a spring, have the disadvantage that they develop a relatively large amount of noise in the freewheel state, which is frequently perceived as annoying, particularly with freewheel hubs which are used in competitive sport or by ambitious and demanding amateur sportsmen.

A similar solution is also shown in each of the documents DE 197 31 451 A1 and DE 298 03 667 U1.

Document U.S. Pat. No. 5,676,227 shows a comparable solution in which only one of the coupling rings is biased towards the other coupling ring by means of a spring. However, with regard to the necessary installation space, this solution is comparable with the solutions in the prior art described above. This solution also develops significant noise in the freewheel state.

Document EP 2 422 996 A1 describes a freewheel hub in which an axially moving coupling ring, which is formed with the hub housing for the purpose of transmitting torque, is biased by means of magnetic forces towards a spur gear fitted to a sprocket carrier.

Finally, with regard to the technical background, reference is made to documents U.S. Pat. No. 5,964,332 and U.S. Pat. No. 5,493,799.

BRIEF SUMMARY OF THE INVENTION

It is an object of the present invention to provide a freewheel hub which operates reliably, develops little noise in the freewheel state and is compact in design.

The present invention relates to a freewheel hub for a bicycle including a hub axle, a hub housing which is rotatably mounted on the hub axle, a sprocket arrangement which is rotatably mounted on the hub axle, and a freewheel coupling. The freewheel coupling is arranged between the hub housing and the sprocket arrangement and optionally allows a relative rotation between the hub housing and the sprocket arrangement or couples the hub housing and the sprocket arrangement for the purpose of transmitting torque. The freewheel coupling, also referred to in the following as the freewheel arrangement or freewheel coupling, has a first coupling ring which is or can be coupled to the hub housing in a torque-transmitting manner, and has a second coupling ring which is or can be coupled to the sprocket arrangement in a torque-transmitting manner. The two coupling rings have tooth systems facing one another by means of which they can optionally be brought into mutual torque-transmitting engagement or out of engagement, and at least one of the coupling rings can be axially displaced relative to the hub axle.

This object may be achieved by a freewheel hub of the kind described in above, in which it is provided that, when viewed in a section containing the axle, the two coupling rings have a stepped wall thickness profile with a section of greater wall thickness and a section of reduced wall thickness. The tooth system in a central radial region of the coupling rings is formed in the section of greater wall thickness in each case, wherein, with one of the two coupling rings, the section of reduced wall thickness is formed radially inside the tooth system and attached thereto. In the other of the two coupling rings, the section of reduced wall thickness is formed radially outside the tooth system and attached thereto. In other words, the two coupling rings are formed in a stepped manner complementary to one another, thus saving installation space in an axial direction for each coupling ring in itself and also in interaction with one another. The tooth system is in each case provided in the region of greater wall thickness, which can also extend beyond the tooth system, in order to strengthen the respective coupling ring. The region which is reduced in its wall thickness enables axial installation space to be saved.

At the same time, according to the invention, it can be provided that, viewed in a section containing the axle, the sections of greater wall thickness overlap in the case of torque-transmitting engagement between the first and second coupling ring. In doing so, the section of greater wall thickness of the one coupling ring rests against the section of reduced wall thickness of the other coupling ring and vice versa. If, for example, the first coupling ring is formed with greater wall thickness in its radially outer region and in its radially central region and with reduced wall thickness in its radially inner region, then the second coupling ring is formed with reduced wall thickness in its radially outer region and with greater wall thickness in its radially central and radially inner region. If the two coupling rings are brought into engagement with one another so that the two tooth systems which are arranged in the radially central region in each case engage with one another as far as possible, then the radially outer region of the first coupling ring formed with the greater wall thickness in the example rests against the radially outer region of the second coupling ring formed with the reduced wall thickness. In this way, further installation space can be saved overall in the axial direction. The coupling rings are adequately stable and rigid due to the respective sections of greater wall thickness. However, when they engage, they require less installation space than in the prior art, as, in their complementary stepped form, they rest against one another and can engage with one another in an overlapping manner, wherein the tooth systems do not have to project additionally in the axial direction.

It must be pointed out that the saving of installation space plays an important role, especially with modern freewheel hubs, in particular in the high-performance range. Particularly when the sprocket arrangement has a cassette with a plurality of—for example 11 or more—sprockets, it is necessary to provide adequate installation space for this, which can be saved at some other point, for example by means of the freewheel arrangement according to the invention.

Further, with a freewheel hub of the kind mentioned in the introduction or above, it can be provided that at least one of the coupling rings is coupled to the hub housing or the sprocket arrangement by means of a synchronizing formation, preferably by means of a tooth system or by means of axial pins, for the purpose of transmitting torque. In doing so, the synchronizing formation can be formed in the section of greater wall thickness.

The use of axial pins for transmitting torque between at least one of the coupling rings and the components associated therewith, that is to say the hub housing or the sprocket arrangement, enables the respective coupling ring to be formed without a radially outer synchronizing formation, such as an external/peripheral tooth system for example, which must be designed to be correspondingly stable. This enables the freewheel coupling according to the present invention to be designed to be more compact and space-saving overall. According to the invention, it can be provided that the torque is transmitted by means of a plurality of axial pins, thus enabling the mechanical loads on the coupling ring to be distributed uniformly.

When a tooth system is used, this can be formed as an external tooth system or an internal tooth system.

The diameter of the coupling rings can be sized in such a way that they lie radially outside a bearing arrangement for the purpose of rotatably mounting the hub housing or the sprocket arrangement on the hub axle. In other words, the freewheel coupling of the freewheel hub according to the invention can be positioned radially outside the bearing arrangement of the hub, thus enabling these to be arranged overlapping in the axial direction and therefore in a space-saving manner in the axial direction. In addition, this enables the bearing arrangement to be optimized without taking the freewheel coupling into account.

The axial pins can be matched to the number of teeth of the tooth system. Ideally, the number of teeth and the number of axial pins are identical. Alternatively, it is also possible that an axial pin is associated with only every nth, for example every second, third or only every fourth, tooth. The axial pins can be solid or also designed as hollow pins in order to save weight. As indicated above, an internal tooth system or an external tooth system can be provided on the respective coupling ring as an alternative to axial pins. In doing so, as asserted above for the axial pins, with regard to number, the teeth of these gear systems can be matched to the teeth of the gear system of the two coupling rings.

According to an embodiment of the invention, it is provided that at least one of the coupling rings is equipped with a plurality of axial holes in which the axial pins engage for the purpose of transmitting torque. In doing so, the axial pins can pass through the respective coupling ring in the section of greater wall thickness, i.e., where the coupling ring is more stable. With this embodiment, the axial pins are therefore attached to the respective other component, namely to the hub housing or to the sprocket arrangement, and pass through the axial holes, preferably in the section of greater wall thickness of the respective coupling ring. Here, the coupling ring is guided on the axial pins so that it can move axially in order to achieve different engagement states. For example, this enables the coupling ring to be moved into a position in which it engages with the other coupling ring for the purpose of transmitting torque or it can be moved out of this position into a freewheel position.

A development of the invention provides that the axial holes which accommodate the axial pins are arranged substantially in a circle. In other words, a pitch circle, the axial holes of which are matched to the size of the axial pins, is provided in the respective coupling ring. The axial holes can be circular or formed as elongated holes to also enable certain radial control movements of the respective coupling ring, for example in an angular range from 2° to 5° in the circumferential direction, as well as an axial movement capability.

When tooth systems are used instead of axial pins, these tooth systems can be provided with play in the circumferential direction, for example in an angular range from 2° to 5° in the circumferential direction.

According to a further embodiment of the invention, it can be provided that the axial pins are fixed on the sprocket arrangement, wherein the second coupling ring has the axial holes which accommodate the axial pins. In this embodiment, for example, the first coupling ring, which is coupled to the hub housing for the purpose of transmitting torque, is fixed, whereas the second coupling ring is axially guided on the axial pins, which are securely attached to the sprocket arrangement. As an alternative to this, it is possible for the axial pins to be fixed on the hub housing, wherein the first coupling ring has the axial holes which accommodate the axial pins.

As well as a solution in which the axial pins are fixed on the hub housing or on the sprocket arrangement, in alternative embodiments of the invention it is also possible for at least one of the coupling rings to be provided with a plurality of axial pins with which it is axially guided in recesses of the sprocket arrangement or the hub housing. The axial pins can be molded directly on the coupling ring or attached thereto.

According to the present invention, it is not necessary for both coupling rings to be coupled to the respective other component, hub housing or sprocket arrangement by means of axial pins for the purpose of transmitting torque. Alternatively, it can also be provided that one of the coupling rings is formed with the hub housing or the sprocket arrangement with an external tooth system for the purpose of transmitting torque. Basically, the following variants are possible according to the invention:

(i) Both coupling rings can be moved axially, wherein the one is (spring-) biased towards the other, or (ii) Only one of the coupling rings can be moved axially, wherein the other is completely or substantially axially fixed.

In this context, "substantially axially fixed" means that, for example, it can be slightly displaced axially under the deformation of a damping element, wherein the damping element serves substantially to prevent the development of noise.

According to the invention, the following variants arise:
The first coupling ring is spring-loaded, and the second coupling ring is substantially axially fixed but damped.
The first coupling ring is spring-loaded, and the second coupling ring can be moved axially in the direction of the first coupling ring (by means of an undercut or control ring as described below). In doing so, both coupling rings can be damped.
The first coupling ring is spring-loaded in the direction of the second coupling ring, wherein a stop limits the axial movement of the first coupling ring in the direction of the second coupling ring such that the maximum overlap which is possible from the tooth geometry is not reached but a minimum overlapping of the teeth is guaranteed; the second coupling ring can be moved axially in the direction of the first coupling ring (and is drawn thereto in a load state). In doing so, once again both coupling rings can be damped.

It has been stated above that at least one of the coupling rings executes an axial movement to switch between a torque-transmission state and a freewheel state. In this context, it can be provided that at least one of the coupling rings is biased towards the respective other coupling ring with an axial biasing force. In doing so, it is possible that the first coupling ring is biased towards the second coupling ring with an axial biasing force, or that the second coupling ring is biased towards the first coupling ring with an axial biasing force or that both coupling rings are each biased towards one another.

In order to obtain the biasing force, it can be provided that this is achieved by means of a spring or magnetically in each case. If a spring is used, this can be supported on the hub housing or on the sprocket arrangement, for example, by means of its one end and axially bias the respective axially moving coupling ring with its other end. If magnets are used to obtain the biasing force, it can be provided that a plurality of magnets is arranged on the first or/and the second coupling ring, wherein a complementary magnet on the sprocket arrangement or the hub housing is associated with each magnet, wherein each pair comprising magnet and complementary magnet exerts the axial biasing force on the respective coupling ring. The use of magnets has the advantage that the magnetic forces have a diminishing characteristic with increasing distance, and that, in addition, no mechanical wear can occur, such as, for example, when a rubbing spring element which is permanently compressed is used. Further, this arrangement saves space, as the magnets can be attached in almost any way to the respective components, i.e., particularly at such points where installation space is available. Unlike springs, the use of magnets provides the additional option of feeding the force flow through another component which, for example, moves relative to the magnets. For example, the force flow can therefore be fed through a seal which is fitted to the hub housing and is arranged between two magnets. This results in further freedom in the design of the hub arrangement.

In order to obtain the respective force, the magnets are preferably arranged in such a way that mutually opposing magnets are fitted on two components which are to be biased with respect to one another, for example the sprocket arrangement and the second coupling ring, wherein identical poles face one another so that a repelling magnetic force is achieved. Alternatively, it is of course also possible to choose the arrangement so that an attractive magnetic force is achieved, for example by arranging one magnet of a magnet pair on the hub housing and the other magnet of the magnet pair on the second coupling ring.

With regard to the tooth system of the two coupling rings for the purpose of transmitting torque or for achieving a freewheel state, with a freewheel hub of the kind described in the introduction, it can be provided that the first coupling ring and the second coupling ring are formed with complementary sawtooth tooth systems on the surfaces of said coupling rings which face one another, wherein each sawtooth of the tooth system has a transmission or load flank and a sliding flank, wherein, when torque is transmitted between first and second coupling ring, a plurality of load flanks of the first coupling ring engage with a plurality of load flanks of the second coupling ring, and wherein, in a non-torque-transmitting freewheel state, the sliding flanks of the first coupling ring slide against the sliding flanks of the second coupling ring or the two coupling rings are contact-free.

The use of sawtooth system has the advantage that the respective teeth require only relatively little height and therefore only a relatively small axial installation space. They can be formed as spur gearing on the faces of the two coupling rings which face one another. The development of the tooth flanks can be substantially planar or also discontinuous, that is to say the pitch of the tooth flanks can be different in order to achieve a progressive engagement effect for example. The use of a sawtooth system has the further advantage that a multiplicity of teeth, ideally all teeth, can take part in transmitting the torque, which is accompanied by a favorable and uniform force distribution over the whole circumference of the respective coupling rings and also enables lightweight components to be used.

A development of an embodiment of the invention provides that recesses or openings are provided in the region of the tooth systems in at least one of the coupling rings, wherein at least one surface of the recesses or openings forms the load flank in at least some sections. This makes it possible for the coupling rings not to be solid but to be provided with openings. As a result, further weight can be saved and the coupling rings can be further reduced in their axial thickness, as the necessary tooth flanks provided for the purpose of transmitting torque can be formed from surfaces of the respective openings. The openings also simplify the production of the tooth system, in particular in the case of undercut teeth, as the load flanks of the teeth are more easily accessible over their whole axial length.

An embodiment of the invention provides that the load flanks run substantially parallel to the axial direction of the respective coupling ring. In order to facilitate a mutual engagement of the two coupling rings and, as a result, to make the transmission of torque more reliable, a development of the invention provides that, with both coupling rings, the load flanks each have an undercut when viewed in the axial direction. Because of the axial movement capability of at least one of the coupling rings, this leads to the load flanks provided with an undercut moving towards one another whenever both coupling rings engage with one another to the benefit of an increasing mutual engagement. The undercut ensures that the two engaging tooth systems "mutually attract one another" so to speak. In particular, with the coupling rings with openings in the region of the tooth systems, the undercut tooth flanks are considerably easier to machine on account of the better accessibility. The angle of the undercut on the transmission flank (load flank) can be 7° to 20°. The slope of the sliding flanks can be 20° to 40° measured with respect to a plane orthogonal to the axle. The slope of the control flanks can also be 20° to 40°.

Further, with regard to the geometrical design of the two systems, it can be provided that, with the first or/and second coupling ring, when viewed in the axial direction, the extension of the sliding flanks in the circumferential direction is in each case greater than the width of an adjacent hole, opening, recess or an adjacent cutout between the tooth under consideration and the following tooth in the circumferential direction. This ensures that, in every state, even when the two tooth systems are strongly engaged, in the event of a load change in which a transition from a torque-transmitting state to a freewheel state is required, the sliding surfaces safely slide on top of one another, thus enabling the two coupling rings to be reliably disengaged. In other words, such sizing of the sliding surfaces guarantees that, in every operating state, when viewed in the axial direction, the sliding surfaces of the first coupling ring overlap in at least some sections with the sliding surfaces of the second coupling ring and are thus able to slide on top of one another in the event of a load change.

Further, the sliding flanks can be designed to be planar or discontinuous. In the latter case, suitable contouring, for example with increasing pitch, of the sliding flanks enables an axial pulse to be imparted to the second coupling ring when sliding, which ensures a reliable separation of the two coupling rings.

An embodiment of the invention further provides that an axial stop, which limits the axial movement of the coupling ring, is provided for at least one of the coupling rings in the direction of the respective other coupling ring. The axial movement can be effected by a mechanical spring-biasing or by magnetic forces. Further, in this context, it can be provided that the hub housing is equipped with an axial stop for the axially moving second coupling ring. The axial stop can be formed integrally in the hub housing or by providing an additional component, for example a damping coupling ring. This also enables impact noises to be suppressed. In this context, it can additionally or alternatively be provided that the hub housing is equipped with a damping element for a damped contact of the first coupling ring. This damping element, which serves to minimize noise, can, for example, be formed from a rubber ring arranged in the hub housing.

It has been stated above that an axial displacement of at least one of the coupling rings can be achieved by applying an axial force, for example by means of a spring element or by means of magnet pairs. The design of the load flanks with undercut can also be used to achieve axial movements of one or both coupling rings after an initial engagement of the load flanks. In addition or alternatively, it is also possible to use a control element which ensures an axial displacement of at least one of the coupling rings depending on the relative direction of rotation between hub housing and sprocket arrangement. At the same time, in an embodiment of the invention, it can be provided that a control ring, which is coupled to the hub housing or to the sprocket arrangement in a fixed rotational relationship, is associated with one of the two coupling rings. This control ring can have a control tooth system which engages with a complementary control tooth system of the associated coupling ring, wherein the complementary control tooth system of the associated coupling ring slides against the control tooth system under the action of a control force so that an axial movement of the coupling ring occurs. The control flanks of the control tooth system and of the complementary control tooth system which effect an axial control movement can have an angle of inclination of 20° to 40° to a plane which is orthogonal to the axle.

For example, the control ring can be securely connected to the hub housing or to the sprocket arrangement, in particular pinned or fixed by some other means therein.

In order to achieve a control movement of the coupling ring to be axially displaced in each case, it is necessary for it to be moved relative to the control ring. Only small relative movements are necessary for this, for example relative movements caused by inertia or by friction torque. A variant of this embodiment therefore provides that the control force is produced by means of a friction coupling of the coupling ring associated with the control ring with a component of the freewheel hub which rotates relative to the control ring. In particular, in this context, it can be provided that the component comprises a seal which seals the freewheel hub with respect to the environment. In other words, the coupling ring is equipped with a friction section which is in frictional engagement with the seal and is therefore gently braked by the frictional engagement with respect to a rotation of the sprocket arrangement. This results in a kind of dragging torque, by means of which an axial movement can be achieved by the coupling ring sliding on corresponding control surfaces of the control ring.

BRIEF DESCRIPTION OF THE SEVERAL VIEWS OF THE DRAWINGS

The invention is illustrated by way of example below based on the attached figures.

FIGS. 5a-5c are different views of the coupling ring of the first embodiment, which is couplable to the hub housing for the purpose of transmitting torque;

FIGS. 6a-6c are different views of the coupling ring of the first embodiment couplable to the sprocket arrangement for the purpose of transmitting torque;

FIGS. 7a-7c are different views of the two coupling rings according to FIGS. 1 to 6 with full engagement for the purpose of transmitting torque, wherein the tooth system is designed with undercut;

FIG. 8 is a perspective diagram of an alternative coupling ring with axial pins formed thereon;

FIG. 9 is a diagram corresponding to the section according to FIG. 2 of a further embodiment of the invention with a control ring arranged between the hub housing and the coupling ring associated therewith;

FIGS. 10a-10c are different views of the coupling ring of the second embodiment coupled to the hub housing for the purpose of transmitting torque;

FIGS. 11a-11c are different views of the coupling ring of the second embodiment couplable to the sprocket arrangement for the purpose of transmitting torque.

FIGS. 12a and 12b are different isolated diagrams of the two coupling rings and of the control ring in a freewheel state of the hub;

FIGS. 13a and 13b are different isolated diagrams of the two coupling rings and of the control ring in a transitional state between freewheel state and full engagement of the hub for the purpose of transmitting torque;

DETAILED DESCRIPTION OF THE INVENTION

Figure 1:
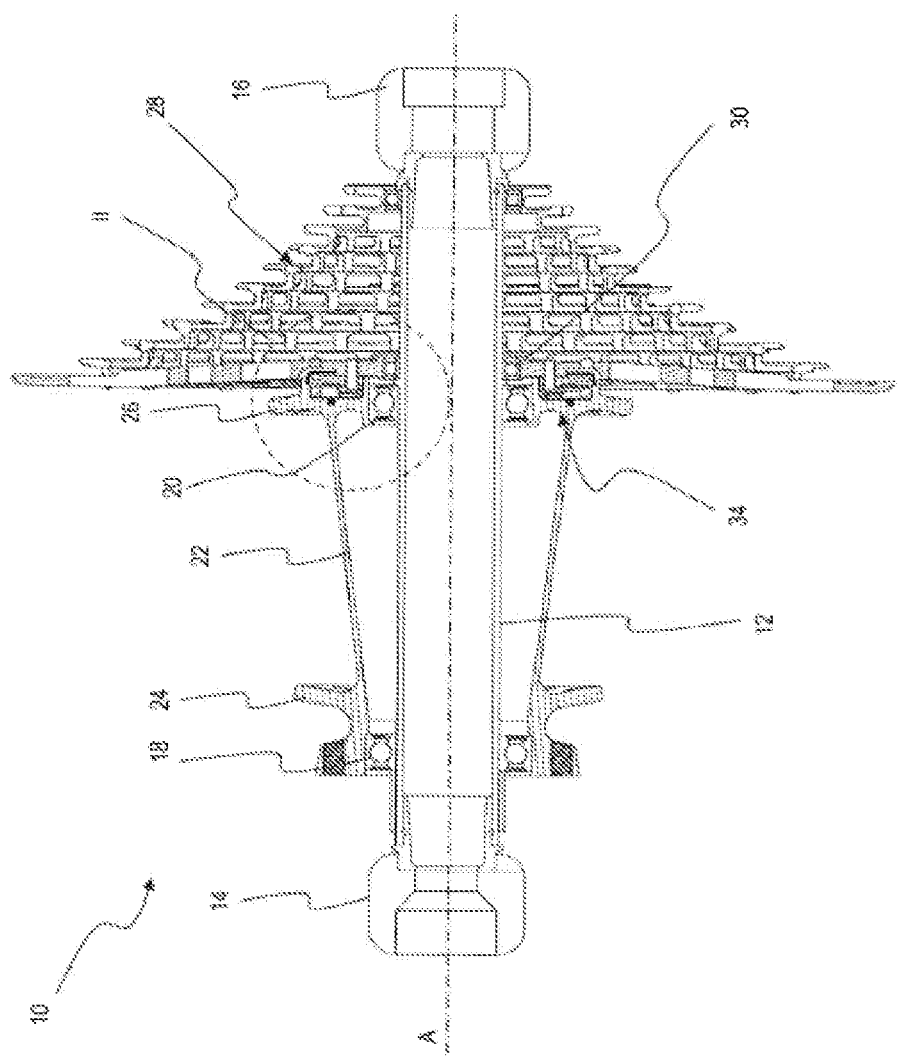
FIG. 1 is a sectional view of a first embodiment of the freewheel hub according to the invention.

An embodiment of a freewheel hub according to an embodiment of the invention is shown in FIG. 1 in a section containing the axle and is designated in general by 10. The longitudinal axis of the freewheel hub 10 is designated in general by the letter A. The freewheel hub 10 includes an axle 12, into which can be inserted a half-axle, which is not shown, with a quick-clamping mechanism, by means of which the axle 12 can be fixed to extensions 14, 16 of a bicycle frame.

A hub housing 22 is rotatably mounted on the axle 12 by means of a bearing arrangement with the two anti-friction bearings 18, 20. The hub housing 22 has two spoke flanges 24, 26 to which spokes can be attached in a manner which is known per se. In addition, a seal 27, which is securely attached to the hub housing 22 by means of a fixing section 29 and projects radially inwards, can be seen in the enlarged diagram of FIG. 2. Furthermore, a sprocket arrangement 28 is rotatably mounted on the axle 12 by means of a bearing arrangement 30, 32.

In the example shown, the sprocket arrangement 28 includes a sprocket cassette with a total of 11 sprockets, which are connected by means of a drive chain (not shown) to a chain wheel arrangement on the pedal side in order to provide a drive. When a cyclist drives the pedals, the drive movement is transmitted from the respective chain-carrying chain wheel via the drive chain (not shown) to the respective chain-carrying sprocket which is selected by the sprocket arrangement 28 so that the sprocket arrangement is driven rotationally. The torque acting on the sprocket arrangement 28 is transmitted by means of a freewheel coupling 34, which is explained in detail below, to the hub housing 22 in order to provide a drive. If the cyclist interrupts his drive movement or if the hub housing 22 rotates faster about the axis A than the sprocket arrangement 28, for example when riding downhill, then the freewheel coupling 34 must disengage, which may be referred to as a freewheel state. The sprocket arrangement 28 and the hub housing 22 can therefore be coupled to one another in a fixed rotational relationship for the purpose of transmitting torque or, in the freewheel state, decoupled from one another without transmitting torque by means of the freewheel coupling 34. The seal 27 seals the freewheel coupling 34 against external contamination.

Figure 2:
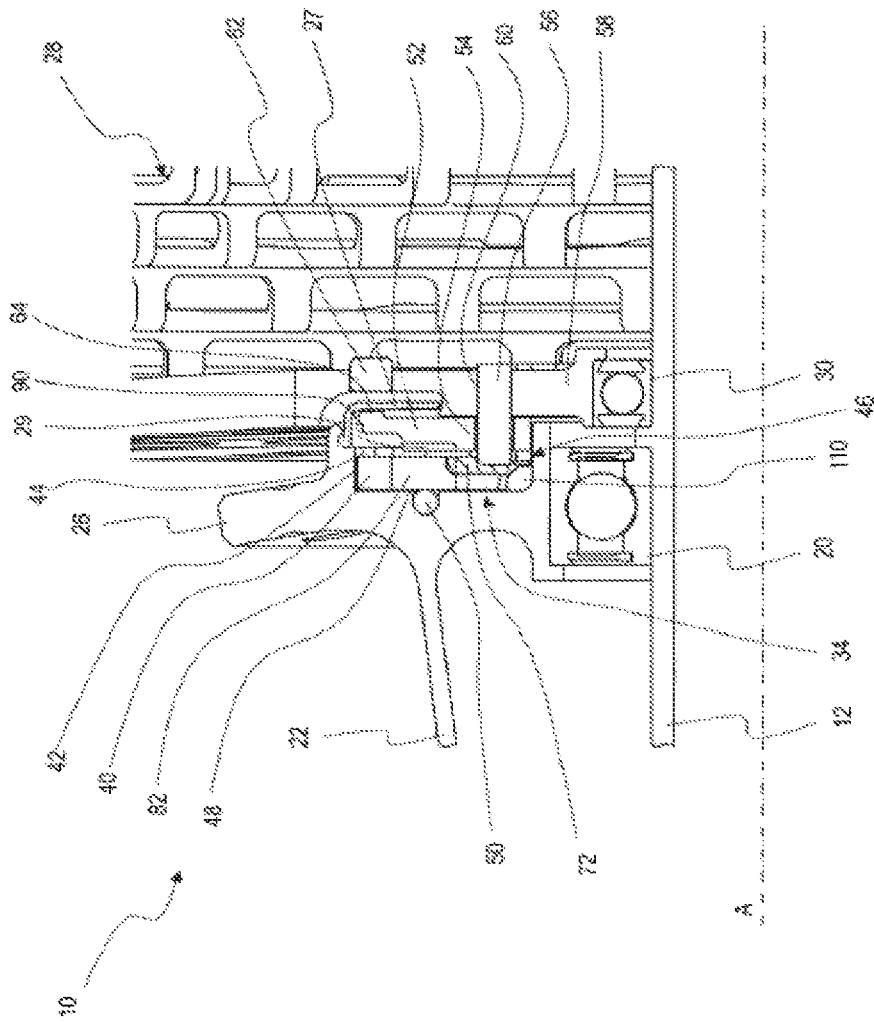
FIG. 2 is an enlarged diagram of the region denoted by II in FIG. 1, wherein the hub is in a freewheel state.

FIG. 2 shows the region denoted by II in FIG. 1 in an enlarged diagram. In particular, the freewheel coupling 34 for the torque-transmitting connection or decoupling of the hub housing 22 and the sprocket arrangement 28 can be seen in FIG. 2. The state according to FIG. 2 shows a decoupled position in a freewheel state.

In particular, it can be seen that a first coupling ring 40 is accommodated in the hub housing 22. On its outer circumferential surface, said coupling ring has an external tooth system 42 which engages in a torque-transmitting manner in a corresponding internal tooth system 44 formed integrally in the hub housing 22. For this purpose, the hub housing 22 has an axial recess 46 at its right-hand end in FIG. 2, in which the first coupling ring 40 is accommodated. Further, an axial groove 48, in which a damping rubber ring 50, which extends slightly beyond the groove in the axial direction, is inserted, is provided in the hub housing 22 in the region of this axial recess 46. The first coupling ring 40 can be displaced in the axial direction relative to the hub housing 22 and rests cushioned against the rubber ring 50.

Further, a second coupling ring 52, which can likewise be displaced in the axial direction, can be seen in FIG. 2. The second coupling ring 52 has a plurality of axial holes 54. Axial pins 56, which are fixed in a carrier disc 58 of the sprocket arrangement 28 at regular angular intervals corresponding to the position of the axial holes 54, engage in these axial holes 54. The axial pins 56 are securely pressed into corresponding holes 60 in the carrier disc 58 for this purpose. The axial holes 54 in the second coupling ring 52 are sized in such a way that slight play is present between the axial pins 56 and the axial holes 54, thus enabling the second coupling ring 52 to be moved easily in the axial direction on the axial pins 56.

Further, it can be seen in FIG. 2 that a plurality of magnets 62 (only one of which is shown) is provided at regular angular intervals in the carrier disc 58. Corresponding magnets 64 (only one of which is shown) are attached to the second coupling ring 52. The two magnet pairs 62, 64 are in each case arranged in such a way that they have identical poles on sides which face one another, so that the second coupling ring 52, which is mounted so that it can move axially, is biased in the direction of the first coupling ring 40 due to the acting repelling magnetic forces.

It can also be seen in FIG. 2 that the first coupling ring is designed with a greater wall thickness in its radially outer region and in its radially central region than in its radially inner region. Conversely, the second coupling ring 52 is formed with reduced wall thickness in its radially outer region and with greater wall thickness in its radially central and its radially inner region where it also accommodates the axial pins 56. In their radially central regions with greater wall thickness, both coupling rings 40, 52 have spur gears 72, 90 which face one another and are designed as sawtooth systems.

FIGS. 5a to 5c, FIGS. 6a to 6c and FIGS. 7a to c are discussed below regarding the design of the two coupling rings.

FIGS. 5a to 5c show the first coupling ring 40 in different views. Here, FIG. 5a shows a perspective view with a lateral viewing direction of the face surface on which the spur gearing is provided and which faces the second coupling ring 52. FIG. 5b shows a sectional view containing the axle, and FIG. 5c shows a view corresponding to FIG. 5a but with a lateral viewing direction of the face surface which faces the hub housing 22.

As can be clearly seen in the figures, the first coupling ring 40 has the peripheral tooth system 42 with which it engages with the internal tooth system 44 of the hub housing 22. The peripheral tooth system 42 is provided running in a straight line in the axial direction. Further, the different wall thicknesses can be seen, particularly in FIGS. 5a and 5b. The first coupling ring 40 has a wall thickness $s_1$ in the radially outer region 70 and in the radially central region in which the tooth system 72 is provided. In the radially inner region 74 on the other hand, the first coupling ring 40 is designed with reduced wall thickness $s_2$.

As can be seen particularly in FIGS. 5b and 5c, the individual teeth 75 of the tooth system 72 are formed with a sawtooth profile, wherein each tooth 75 has a sliding flank 78 and a load flank 80. The sliding flanks 78 are provided to ensure that the second coupling ring 52 slides against the first coupling ring 40 in the event of a freewheel state. The load flanks 80 are formed with undercut and are provided to ensure a reliable torque-transmitting engagement with the complementary load flanks of the second coupling ring 52. This is discussed below with reference to FIGS. 7a to 7c. The load flanks 80 have a slope of approximately 10° with respect to the axle direction. The sliding flanks 78 have a slope of approximately 20° to a plane which is orthogonal to the axle.

Further it can be seen that in each case an opening 82, which penetrates the coupling ring 40, is provided between adjacent teeth. In each case, a radially running surface of the opening 82 forms part of the load flank 80 so that its surface, in particular the undercut of the load flank 80, is easier to machine.

FIGS. 6a to 6c show the second coupling ring 52, wherein FIG. 6a shows a perspective view with lateral viewing direction on that face side which faces the sprocket arrangement 28. FIG. 6b shows a sectional view containing the axle, and FIG. 6c shows a view corresponding to FIG. 6a but with lateral viewing direction on that face surface on which the spur gearing 90 is provided and which faces the first coupling ring 40.

As can be clearly seen in the figures, the second coupling ring 52 does not have a peripheral tooth system but a pitch circle with a plurality of axial holes 54 which, as shown in FIG. 2, accommodate the axial pins 60 of the carrier disc 58 of the sprocket arrangement 28 and are axially guided thereon. Further, the different wall thicknesses can be seen, particularly in FIGS. 6a and 6c. The second coupling ring 52 has a wall thickness $s_4$ in the radially inner region 88, in which the pitch circle with the axial holes 54 is arranged, and in the radially central region in which the tooth system 90 is provided. In the radially outer region 92 on the other hand, the second coupling ring 52 is designed with reduced wall thickness $s_5$.

As can be seen particularly in FIGS. 6b and 6c, the individual teeth 94 of the tooth system 90 are in turn formed with a sawtooth profile, wherein each tooth 94 has a sliding flank 96 and a transmission or load flank 98. The sliding flanks 96 are provided to ensure that the second coupling ring 52 slides against the corresponding sliding flanks 78 on the first coupling ring 40 in the event of a freewheel state. The transmission or load flanks 98 are provided to ensure a torque-transmitting engagement with the complementary transmission or load flanks 80 of the first coupling ring 40. This is discussed below with reference to FIGS. 7a to 7c. Further, it can be seen that in each case an opening 100 which penetrates the second coupling ring 52 is provided between adjacent teeth. In each case, a radially running surface of the opening 100 forms part of the transmission or load flank 98.

The principle of operation is discussed below with reference to FIGS. 2 to 4:

As already explained above, FIG. 2 shows the freewheel state in which the two coupling rings 40, 52 are disengaged. This state occurs, for example, when the bicycle is moving but the cyclist does not drive the pedals, or when, for other reasons, the hub housing 22 rotates faster than the sprocket arrangement 28, for example when riding downhill. In this state, the sliding surfaces 78 and 96 slide on top of one another. The two tooth systems 72 and 90 are not engaged with one another.

Figure 3:
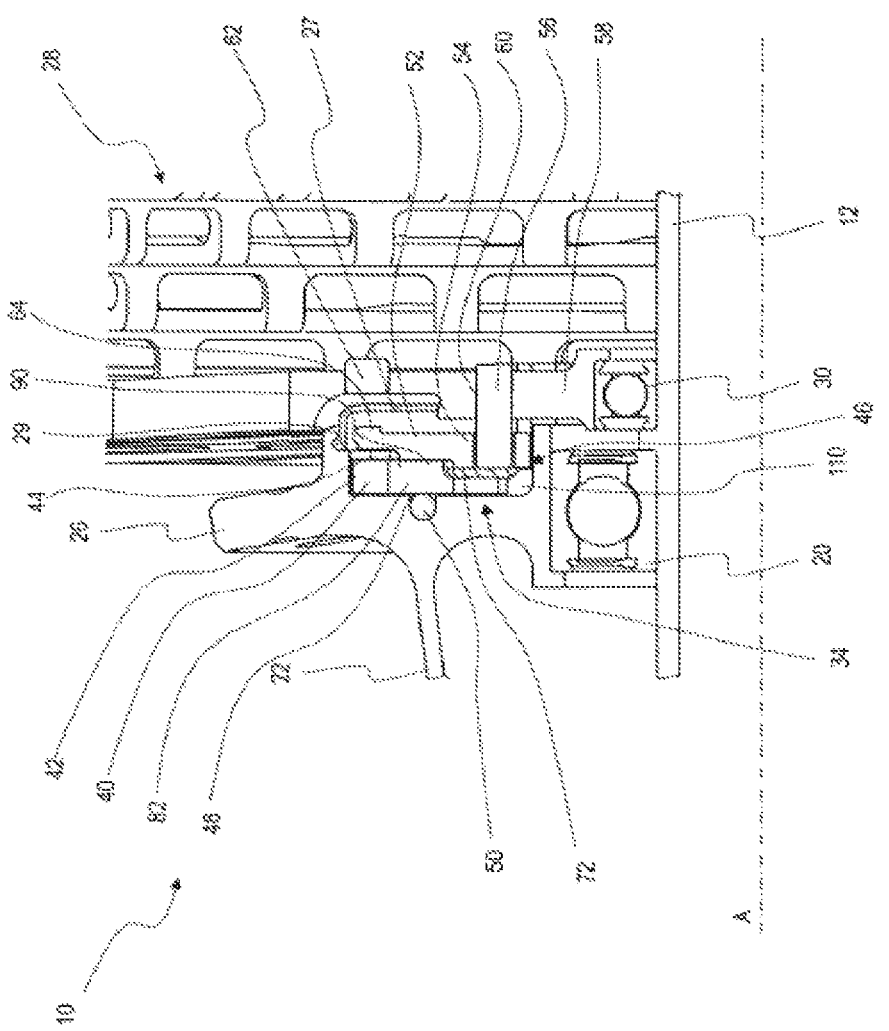
FIG. 3 is a diagram of the region shown in FIG. 2, wherein the hub is in a transitional state between freewheel state and full engagement for the purpose of transmitting torque

FIG. 3 shows a transitional state in which the two tooth systems 72 and 90 are already partially but not fully engaged. As a result of a state in which the sprocket arrangement 28 rotates at least as quickly or faster than the hub housing 22, the second coupling ring 52 is displaced to the left in the axial direction in FIG. 3 guided on the axial pins 56 due to the effect of the magnets 62 and the complementary magnets 64 so that the two tooth systems 72 and 90 engage with one another. In doing so, the transmission or load flanks 80 and 98 rest against one another so that torque is already transmitted. However, in FIG. 3, the second coupling ring 52 cannot be displaced further to the left in the axial direction on the axial pins 56, as the radially inner section of the coupling ring 52 comes to rest on a stop ring 110 which is accommodated in the hub housing 22. This stop ring 110 can be made of plastic or some other damping material.

Figure 4:
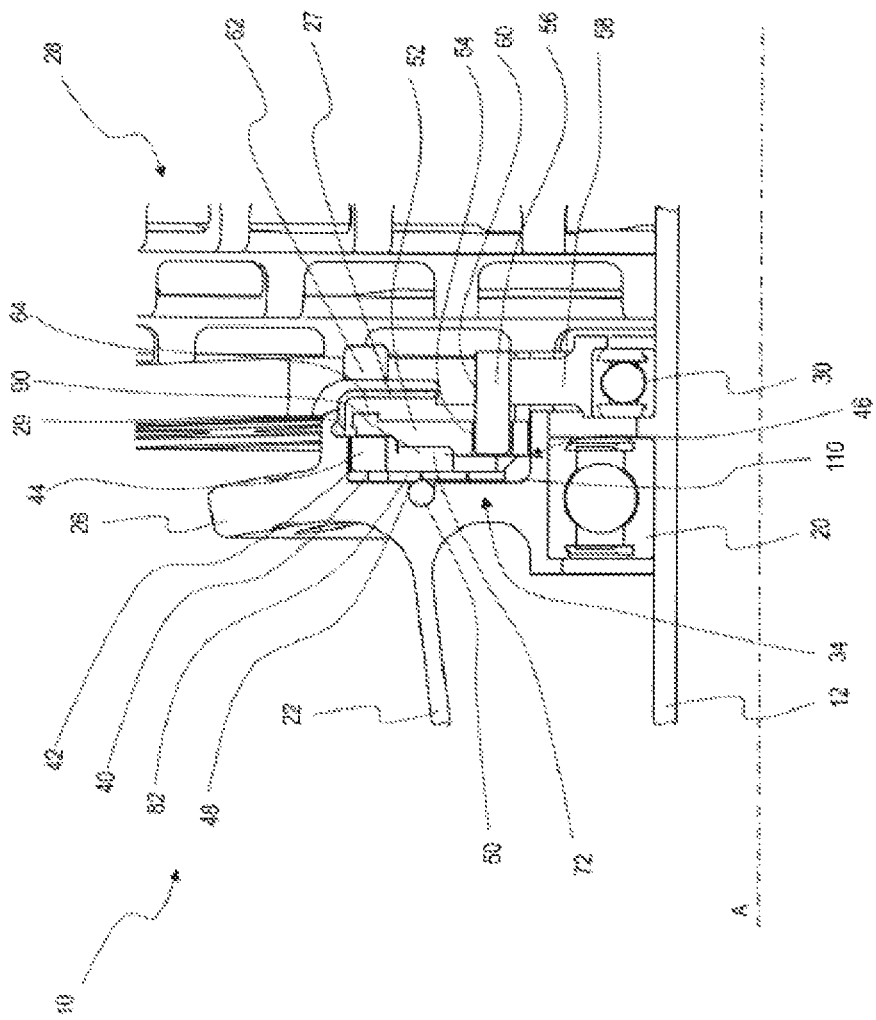
FIG. 4 is a diagram of the region shown in FIGS. 2 and 3, wherein the hub is in a state of full engagement for the purpose of transmitting torque.

FIG. 4 shows a state of full engagement. Here, the first coupling ring 40 is axially displaced to the right under the effect of the undercut of the two transmission or load flanks 80 and 98 of the tooth systems 72 and 90 (as also in FIGS. 7a to 7c), wherein it is still in torque-transmitting engagement with the hub housing 22 via the peripheral tooth system 42 and the internal tooth system 44. The undercut of the tooth systems 72 and 90 ensures that the first coupling ring 40 is or has been drawn in the axial direction towards the second coupling ring 52, which is blocked axially by the stop 110. FIG. 4 therefore shows the state of maximum engagement of the two tooth systems 72 and 90.

The multiplicity of teeth of the two interlocking tooth systems 72 and 90 involved in transmitting torque results in a uniform force distribution over the whole circumference of the two coupling rings 40, 52. This is assisted in that, on account of the openings 82 and 100, the teeth 75 and 95 are easily deformable under load, thus enabling the forces to be better distributed. The torque flow or force flow runs starting from the sprocket arrangement 28 via the carrier disc 58, the axial pins 56 to the second coupling ring 52, from here via the interlocking tooth systems, that is to say in particular via the transmission or load flanks 80 and 98, to the first coupling ring 40 and from here directly into the hub housing 22 to drive the rear wheel.

As soon as the hub housing 22 and therefore the first coupling ring 40 rotates faster than the second coupling ring 52 with the sprocket arrangement, the undercut transmission or load flanks 80 and 98 disengage once more. The sliding flanks 78 and 96 of the teeth 75 and 94 slide against one another. The first coupling ring 40 and the second coupling ring 52 move in the axial direction into their starting positions while imparting this sliding movement, wherein they rest cushioned against the hub housing 22 and the sprocket arrangement 28 respectively, thus minimizing impact noise.

By way of explanation, FIGS. 7a to 7c show an engaged state of the two coupling discs 40 and 52 of the first embodiment of the invention, in which the individual teeth 75 and 94 are each provided with an undercut of approximately 20° on the transmission or load flanks 80 and 98, as can again be clearly seen in FIGS. 7a and 7b. The diagrams show a state in which the two coupling rings 40 and 52 are fully engaged with one another, wherein, in the view according to FIG. 7a, the two coupling rings 40 and 52 are partially cut away in order to clarify the engaged state of individual teeth at the transmission or load flanks 80 and 98. Such a design of the teeth with an undercut has the advantage that, on achieving the state according to FIG. 3, the transmission or load flanks 80 and 98 slide against one another in the direction of increasing engagement.

Further, it can be seen in FIG. 7a that the two sliding flanks 78 and 96 are sized in a radial direction such that, even in the maximum engaged state of the two tooth systems 72 and 90, they still rest against one another with a surface section, so that, in the event of a subsequently occurring load change, the two sliding flanks 78 and 96 can slide against one another and drive the coupling rings apart.

Further, in addition to the diagram according to FIG. 6a, a plurality of recesses 102 for accommodating magnets can be seen in FIG. 7a.

FIG. 8 shows a coupling ring 52 with axial pins 120 formed thereon. As an alternative to a design in which the coupling ring can be seen with a pitch circle, the axial pins 120, 122 are formed directly on or securely attached to this coupling ring, for example in appropriate openings. These axial pins have different lengths, wherein in each case five short axial pins 120 are arranged at equal angular distances and wherein every sixth axial pin 122 is formed with a greater axial length. The axial pins 120, 122 are accommodated in corresponding axial recesses (not shown) in the carrier disc 58 of the sprocket arrangement 28 so that they can move axially. The sawtooth system 90, which in this embodiment is designed with rounded sliding flank profiling and therefore has a discontinuous sliding flank pitch, can also be seen in FIG. 8.

FIGS. 9 to 14 show a further embodiment of the invention with a control ring 130. To simplify the diagram, the sprocket cassette is not shown. The control ring 130 is provided with projections 132, by means of which it is fitted to the hub housing 22 in corresponding recesses 133 in a fixed rotational relationship. The projections can be seen in particular in the diagrams according to FIGS. 12a to 14b. The control ring 130 also remains fixed in its axial position, wherein it is fixed to the hub housing 22 in a fixed (rotational) relationship. For this purpose, the control ring 130 has axially projecting control teeth 134. These engage in the openings 82 between the teeth 75 in the first coupling ring 40. The openings 82 are shown in FIGS. 10a-c, 12a, 12b, 13a, 13b and 14a, 14b. They are provided on the rear with a control surface 84, which interacts with the control teeth 134 in order to effect a control movement of the first coupling ring 40. This is discussed in detail below.

As already described with reference to the first embodiment, the second coupling ring 52 according to FIGS. 11a-c has axial holes 54 into which the axial pins 56 project. The axial pins 56 are pressed into the carrier disc 58. The second coupling ring 52 is guided so that it can move axially on the axial pins 56 and can be moved axially along them.

It should be mentioned that the peripheral tooth system 42 of the first coupling ring 40 is accommodated in the corresponding internal tooth system 44 in the hub housing 22 with a certain circumferential play of a few degrees, preferably in the range from 2-5°. As a result, the first coupling ring 40 has a certain rotational play relative to the hub housing before the two tooth systems 42, 44 come into torque-transmitting engagement after a load change. Both coupling rings 40 and 52 again have tooth systems 72 and 19 facing one another as described above.

As shown in FIG. 10c, the openings 82 of the first coupling ring 40 are in each case provided with a lead-in chamfer 84 in the region of said openings facing away from the tooth system. This acts as a control surface when the first coupling ring 40 is used together with the control ring 130 as is explained in detail below.

In order to describe the principle of operation of the embodiment according to FIG. 9, FIGS. 12a, 12b, 13a, 13b and 14a, 14b are discussed in detail below. In each case, these show the first coupling ring 40, the second coupling ring 52 and the control ring 130.

On its side facing the hub housing 22, the control ring 130 has the previously-mentioned axially projecting pins 132, with which the control ring 130 is securely connected, in particular in a fixed rotational relationship, to the hub housing 22. On the side facing the first coupling ring 40, the control ring 130 has the control teeth 134. The control teeth 134 have a control flank 152 which, in the sectional view according to FIG. 12a, in plan view runs at an angle of approximately 40°. The control teeth 134 engage in openings 82 between the teeth of the first coupling ring 40, which is substantially formed as shown in FIGS. 5a to 5c for the first coupling ring 40. These openings 82 between the teeth are provided with already mentioned complementary control flanks 84, which in each case face the control flanks 152 and likewise have a slope of approximately 40°. Otherwise, the first coupling ring 40 and the second coupling ring 52 are formed as described with references to FIGS. 5a to 5c and 6a to 6c. In other words, the transmission or load flanks 80 and 98 respectively are formed without undercut running in the axial direction. Further, the teeth have sliding flanks 78 and 96 respectively which face one another to bring about a freewheel state.

The freewheel state is shown in FIGS. 12a and 12b. The transmission or load flanks 80 and 98 are not engaged with one another. The two coupling rings 40, 52 can rotate freely with respect to one another.

If a drive movement is now brought about by the cyclist by driving the pedals, then the second coupling ring 52, which is connected to the sprocket arrangement 28 in a fixed rotational relationship by means of the axial pins 56, is driven in a clockwise direction (FIG. 12b, 13b, 14b) with respect to the first coupling ring 40. In doing so, the second coupling ring 52 is axially deflected due to a spring force acting in the direction of the first coupling ring 40 so that the state shown in FIG. 13a, b of a slight overlap of the transmission or load flanks occurs. The spring or biasing force can be applied by means of a compression spring or by magnets (neither shown here for simplification).

Figure 14B:
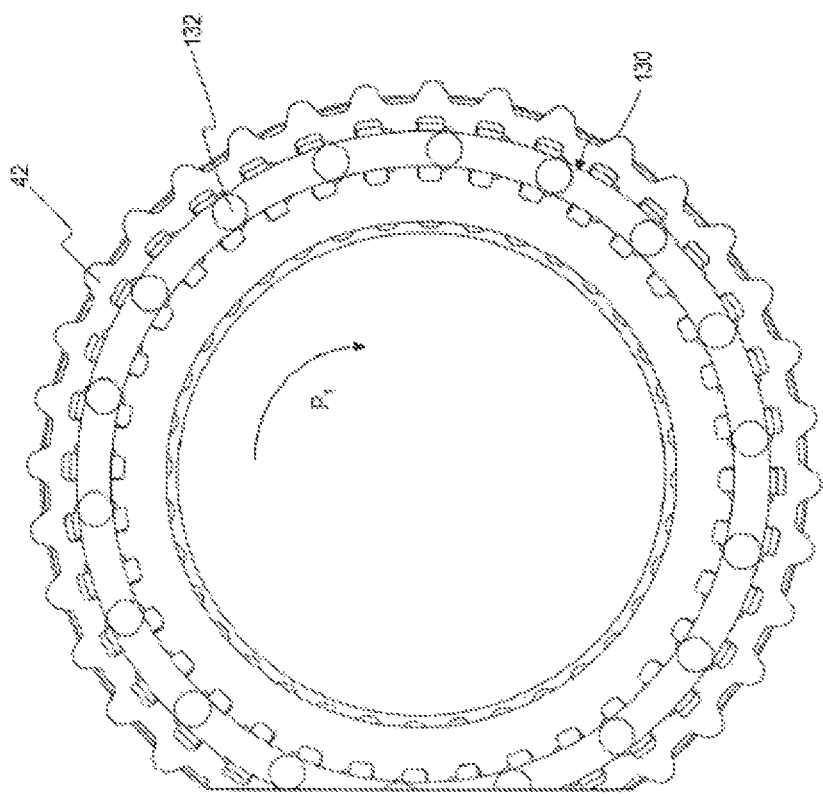
FIGS. 14a and 14b are different isolated diagrams of the two coupling rings and of the control ring in a state of full engagement of the hub for the purpose of transmitting torque.
Figure 14A:
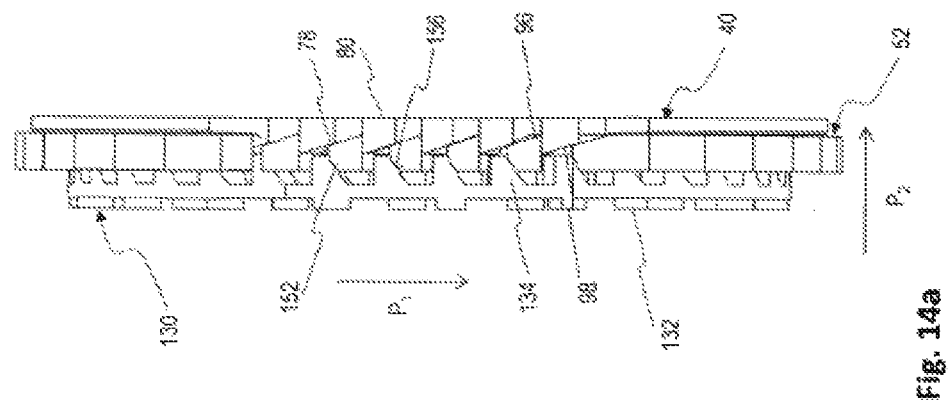

With further drive movement, the second coupling ring 52 drives the first coupling ring 40 via the engaged tooth systems 72, 90 so that the complementary control flanks 84 of the first coupling ring 40 slide on the control flanks 152 of the relatively stationary control ring 130 and the first coupling ring is therefore forced into an axial movement in the direction of the second coupling ring 52. This "screw movement" of the first coupling ring 40 is executed until the load flanks of the peripheral tooth system 40, 42 come into force-transmitting contact with the internal tooth system 44 of the hub housing 22 and therefore the transmission of torque to the hub housing 22 begins. The maximum overlap of the transmission or load flanks of the coupling rings is now reached in this state (FIG. 14a, b).

This relative movement between the first coupling ring 40 and the hub housing 22 is possible to the extent that the tooth play in the tooth systems 40, 44 allows such a relative rotation between the hub housing 22 and the first coupling ring 40, that is to say until this tooth play is used up. This movement play of the first coupling ring 40 in the circumferential direction is matched to the control movement by means of the control teeth 134, which is described once more in detail below.

During the relative rotation between the first coupling ring 40 and the control ring 130, the complementary control flanks 84 of the teeth of the first coupling ring 40 slide on the control flanks 152 of the control teeth 134, which leads to an axial movement of the first coupling ring 40 corresponding to arrow $P_2$. As a result, the teeth 75 of the first coupling ring 40 are brought into torque-transmitting engagement with the teeth 92 of the second coupling ring 52, wherein the transmission or load flanks 98 and 80 come into torque-transmitting engagement. FIGS. 13a and 13b show a transitional state.

On completion of this axial movement of the second coupling ring 52 corresponding to the arrow $P_2$, the transmission or load flanks 80 and 98 are in maximum possible engagement, wherein mutually facing sections of the sliding flanks 78 and 96 rest against one another. The two coupling rings 40 and 52 are at their maximum convergence and are in maximum mutual engagement. The state of maximum engagement is shown in FIGS. 14a and 14b.

As a result of the multiplicity of teeth 75, 94 involved in the transmission of torque, a uniform force distribution results over the whole circumference of the two coupling rings 40, 52. The torque flow or force flow runs starting from the sprocket arrangement 28 via the carrier disc 58, the axial pins 56 to the second coupling ring 52, from here via the engaging tooth systems 72, 90, in particular via the load flanks 80 and 98 of the teeth 75, 94, to the first coupling ring 40 and from here via the interacting tooth systems 42, 44 directly into the hub housing 22 to drive the rear wheel.

As soon as the hub housing 22 and therefore the first coupling ring 40 rotates faster than the second coupling ring 52 with the sprocket arrangement 28, the transmission or load flanks 80 and 98 disengage. The sliding flanks 78 and 96 of the teeth 75, 94 slide against one another. The second coupling ring 52 moves back in the axial direction against arrow $P_2$ to its starting position according to FIGS. 12a and 12b while imparting this sliding movement.

Figure 15:
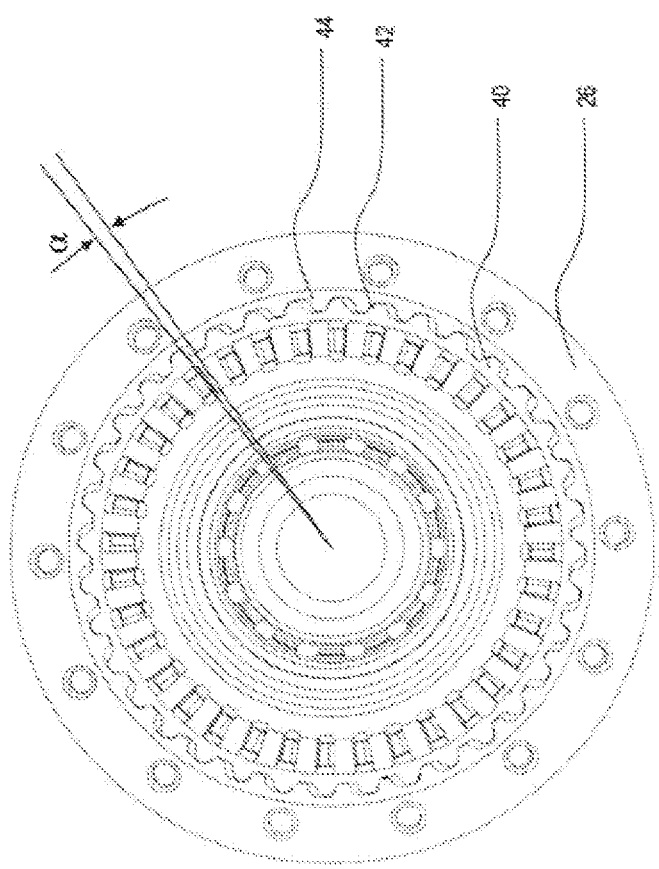
FIG. 15 is a sectional view through a freewheel hub according to the invention according to FIG. 9 along the section line XV.

FIG. 15 shows a view corresponding to section line XV-XV from FIG. 9. As well as the components described above, in particular, the tooth play a in the circumferential direction between the two tooth systems 42 and 44 can be seen here.

Figure 16:
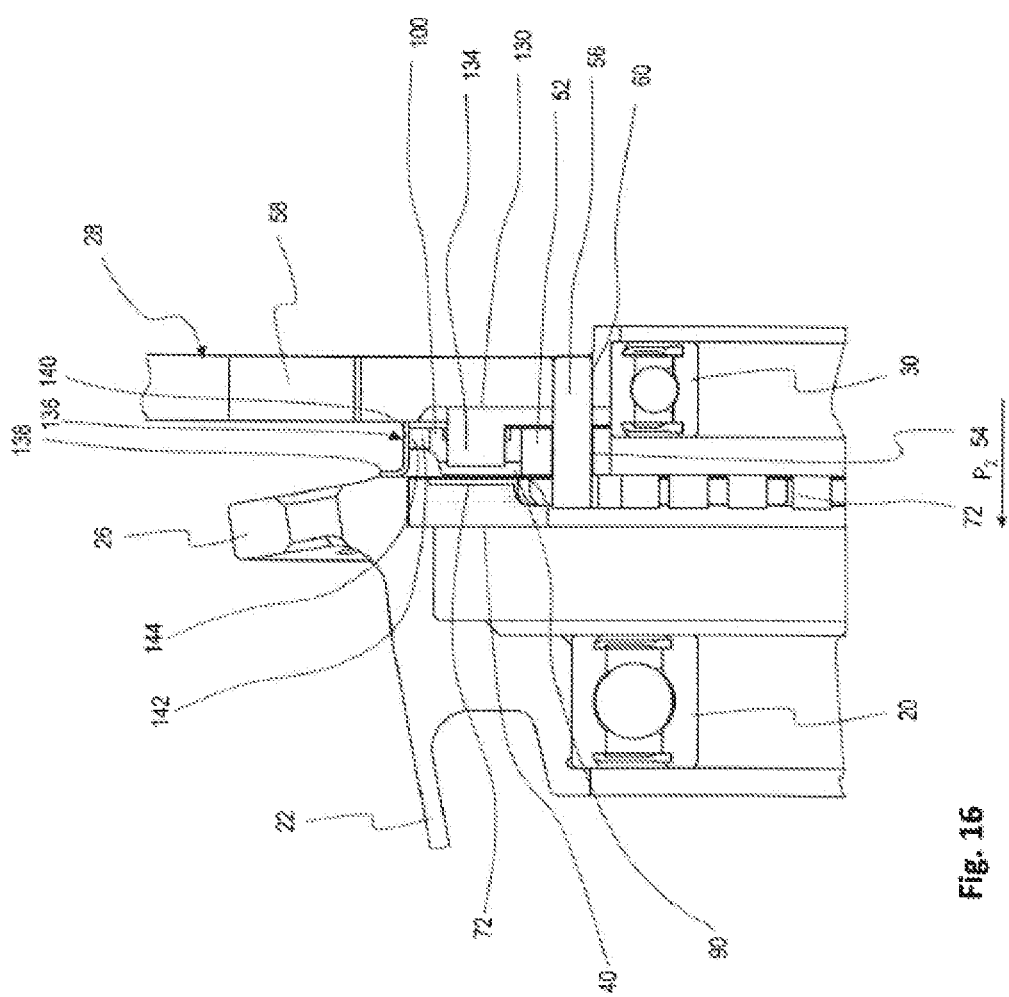
FIG. 16 is a view corresponding to FIG. 9 of a further embodiment of the invention.

In a view similar to the view according to FIG. 9, FIG. 16 shows a further embodiment of the invention with a control ring 130, wherein the control ring 130 is associated with the carrier disc 58. The control ring 130 is likewise provided with a pitch circle with openings 132. However, the control ring 130 is securely attached to the axial pins 56 and remains fixed in its axial position so that it is fixed on the carrier disc 58. The control ring 130 has axially projecting control teeth 134. These engage in the openings 100 between the teeth 94 in the second coupling ring 52. They are provided with profiling at the rear as has been described above with reference to the complementary control surface 84.

The first coupling ring 40 according to FIGS. 10a-c is pressed into the hub housing 22 and is rotationally fixed and axially immovable relative thereto by means of its peripheral tooth system 42.

A seal 136, which is fixed to the hub housing, is provided between the hub housing 22 and the carrier disc 58. This has a fixing section 138 by means of which it is fixed to the hub housing 22, and further has a sealing section 140 which bridges an intermediate space between hub housing 22 and carrier disc 58.

The second coupling ring 52 has a radially outer section 142 which, at its radially outer end, has a friction surface 144 which can be circular or in the form of teeth. In the present case, it is circular. The radial outer surface of this friction surface 144 is in frictional contact with the inner surface of the sealing section 140.

Further, it should be mentioned that the second coupling ring 52 again has openings 54 for accommodating the axial pins 56. However, these openings 54 are formed as elongated holes which afford the second coupling ring 52 a certain circumferential play of a few degrees, preferably in the range from 2-5°. This example movement in the circumferential direction provides the second coupling ring 52 with the possibility of a relative movement with respect to the carrier disc 58 in the circumferential direction similar to that described with regard to the tooth system play for the tooth system 42, 44 of the embodiment according to FIGS. 9 to 15. Both coupling rings 40 and 52 again have tooth systems 72 and 90 facing one another as described above.

The principle of operation of this embodiment is similar to the principle of operation of the embodiment described above:

If a drive movement is brought about by the cyclist by driving the pedals, then the control ring 130, which is securely coupled to the sprocket arrangement (not shown) and its carrier disc 58, is driven in a rotational manner. This occurs as a result of the direct coupling via the axial pins 56 and the control ring 130. Because of the frictional contact between the friction surface 144 in the outer circumferential region of the second coupling ring 52 and the seal 136, the second coupling ring 52 tends to turn with the hub housing 22 so that, for a short time, it lags behind the rotary movement of the carrier disc 58 corresponding to the drive movement. This is possible to the extent that the elongated holes 54 allow a relative rotation between the carrier disc 58 and the second coupling ring 52, that is to say until the axial pins 56 have completely traversed the axial holes. This movement play of the second coupling ring 52 in the circumferential direction is matched to control movement via the control teeth 134.

During the relative rotation between the second coupling ring 52 and the control ring 130, as already described above in a similar way with regard to the embodiment according to FIGS. 9-15, the complementary control flanks 84 of the teeth of the second coupling ring 52 slide on the control flanks 152 of the control teeth 134, which leads to an axial movement of the second coupling ring 52 corresponding to arrow $P_2$. As a result, the teeth of the second coupling ring 52 are brought into torque-transmitting engagement with the teeth of the first coupling ring 40, so that the transmission or load flanks 98 and 80 come into torque-transmitting engagement.

On completion of this axial movement of the second coupling ring 52 corresponding to the arrow $P_2$, the transmission or load flanks 80 and 98 of first coupling ring 40 and second coupling ring 52 are in maximum possible engagement, wherein mutually facing sections of the sliding flanks 78 and 96 rest against one another. The two coupling rings 40 and 52 are at their maximum convergence and are in maximum mutual engagement.

As a result of the multiplicity of teeth involved in the transmission of torque, this results in a uniform force distribution over the whole circumference of the two coupling rings 40, 52. The torque flow or force flow runs starting from the sprocket arrangement via the carrier disc 58, the axial pins 56 to the second coupling ring 52, from here via the engaging tooth systems, in particular via the load flanks 80 and 98, to the first coupling ring 40 and from here directly into the hub housing 22 to drive the rear wheel.

As soon as the hub housing 22 and therefore the first coupling ring 40 rotates faster than the second coupling ring 52 with the sprocket arrangement, the transmission or load flanks 80 and 98 disengage. The sliding flanks 78 and 96 of the teeth 75, 94 slide against one another. The second coupling ring 52 moves back in the axial direction against arrow $P_2$ to its starting position while imparting this sliding movement.

The embodiment according to FIG. 16 has been modified compared with the embodiment according to FIGS. 9 to 15 in that the control ring 130 is attached on the side of the carrier disc 58 and therefore to the sprocket arrangement 28.

With regard to the requirement for installation space, all embodiments of the invention have advantages compared with the prior art. The invention provides a possibility of providing an effective freewheel arrangement with good torque transmission characteristics, low noise development and long service life.

For example, a significant advantage of this arrangement also lies in the fact that the two coupling rings 40 and 52 can be designed in such a way that they can be attached radially outside and axially overlapping the bearing arrangements. This enables considerable installation space to be saved in the axial direction. This can be seen particularly in FIGS. 1 to 4, 9 and 16. With the invention, the coupling rings 40 and 52 can have a considerably greater inside diameter than the outside diameter of the bearing arrangement for mounting the hub housing and sprocket arrangement.

The stepped design of the coupling rings also enables them to be made smaller in their axial extension than with the prior art. The use of axial pins optimizes the force flow and, at least on one coupling ring, removes the requirement for a peripheral tooth system which has to be sized in an appropriately sturdy manner. As a result, lightweight materials can also be used for the coupling rings. This is also possible due to the multiplicity of teeth involved in transmitting torque in that the surface pressure on the individual teeth reduces.

In order to further reduce weight, the axial pins can be in the form of hollow pins.

The described control mechanisms enable the two coupling rings to be engaged and separated from one another easily and reliably.

Further advantages of the invention are the easy manufacture of the undercut surfaces or flanks of the tooth systems due to the openings, low noise development in operation due to the damping elements, which leads to a damped contacting of the parts, and fast engagement and fast release of the engagement on load changes.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A freewheel hub for a bicycle, comprising:
   a hub axle;
   a hub housing rotatably mounted on the hub axle;
   a sprocket arrangement rotatably mounted on the hub axle; and
   a freewheel coupling arranged between the hub housing and the sprocket arrangement, the freewheel coupling having a first coupling ring which couples to the hub housing and a second coupling ring which couples to the sprocket arrangement;
   the first and second coupling rings each having respective tooth systems facing one another which are arrangeable into and out of mutual torque-transmitting engagement, at least one of the first and second coupling rings axially displaceable relative to the hub axle;
   the first and second coupling rings each having a respective stepped wall thickness profile with a section of greater wall thickness and a section of reduced wall thickness, wherein the respective tooth systems in a central radial region of each of the first and second coupling rings is formed in the section of greater wall thickness;
   the section of reduced wall thickness of one of the first and second coupling rings formed radially inside the tooth system and the section of reduced wall thickness of the other of the first and second coupling rings formed radially outside the tooth system.

2. The freewheel hub of claim 1, wherein the sections of greater wall thickness overlap when the first and second coupling rings are in torque-transmitting engagement.

3. The freewheel hub of claim 1, wherein at least one of the first and second coupling rings is coupled to the hub housing or the sprocket arrangement respectively by a synchronizing formation including one of a peripheral tooth system and axial pins to transmit torque.

4. The freewheel hub of claim 3, wherein at least one of the first and second coupling rings is equipped with a plurality of axial holes in which the axial pins engage for the purpose of transmitting torque.

5. The freewheel hub of claim 4, wherein the plurality of axial holes are arranged substantially in a circle.

6. The freewheel hub of claim 4, wherein the axial pins are fixed on the sprocket arrangement and the plurality of axial holes, which accommodate the axial pins, are formed through the second coupling ring.

7. The freewheel hub of claim 4, wherein the axial pins are fixed on the hub housing and the plurality of axial holes, which accommodate the axial pins, are formed through the first coupling ring.

8. The freewheel hub of claim 3, wherein at least one of the first and second coupling rings is provided with the axial pins to axially guide the at least one of the first and second coupling rings in recesses of one of the sprocket arrangement and the hub housing.

9. The freewheel hub of claim 1, wherein at least one of the first and second coupling rings has a peripheral tooth system to transmit torque to one of the hub housing and the sprocket arrangement.

10. The freewheel hub of claim 1, wherein the second coupling ring is biased towards the first coupling ring with an axial biasing force.

11. The freewheel hub of claim 1, wherein the first coupling ring is biased towards the second coupling ring with an axial biasing force.

12. The freewheel hub of claim 10, wherein the axial biasing force is achieved by means of one of a spring and a plurality of magnets.

13. The freewheel hub of claim 11, wherein the axial biasing force is achieved by means of one of a spring and a plurality of magnets.

14. The freewheel hub of claim 12, wherein the plurality of magnets is arranged on one or both of the first and the second coupling rings and a complementary magnet is arranged on one or the sprocket arrangement and the hub housing and associated with each of the plurality of magnets, wherein the plurality of magnets and the complementary magnets exert the axial biasing force.

15. The freewheel hub of claim 13, wherein the plurality of magnets is arranged on one or both of the first and the second coupling rings and a complementary magnet is arranged on one or the sprocket arrangement and the hub housing and associated with each of the plurality of magnets, wherein the plurality of magnets and the complementary magnets exert the axial biasing force.

16. The freewheel hub of claim 1, wherein the first coupling ring and the second coupling ring are formed with complementary sawtooth tooth systems on facing surfaces of the first and second coupling rings, wherein each sawtooth of the tooth systems has a load flank and a sliding flank and when torque is transmitted between the first and second coupling rings, the load flanks of the first coupling ring engage with the load flanks of the second coupling ring and in in a non-torque-transmitting freewheel state, the sliding flanks of the first coupling ring slide against the sliding flanks of the second coupling ring or the two coupling rings are contact-free.

17. The freewheel hub of claim 16, wherein the central radial region of at least one of the coupling rings includes openings, wherein at least one surface of the openings forms at least some of the load flanks.

18. The freewheel hub of claim 17, wherein the load flanks have an undercut when viewed in the axial direction.

19. The freewheel hub of claim 17, wherein the sliding flanks have an extension in the circumferential direction greater than the width of an adjacent opening in the at least one of the coupling rings.

20. The freewheel hub of claim 1, further comprising an axial stop for at least one of the coupling rings formed in the direction of the respective other of the coupling rings, which limits the axial movement thereof.

21. The freewheel hub of claim 1, wherein the hub housing includes a damping element to contactingly damp the first coupling ring.

22. The freewheel hub of claim 1, further comprising a control ring coupled to one of the hub housing and the sprocket arrangement in a fixed rotational relationship and associated with one of the two coupling rings, wherein the control ring has a control tooth system which engages with a complementary control tooth system of the associated coupling ring, wherein the complementary control tooth system of the associated coupling ring slides against the control tooth system under the action of a control force to produce an axial movement of the coupling ring.

23. The freewheel hub of claim 22, wherein the control force is produced by a friction coupling of the coupling ring associated with the control ring with a component of the freewheel hub, which rotates relative to the control ring.

24. The freewheel hub of claim 23, wherein the component includes a seal which seals the freewheel hub with respect to the environment.

* * * * *